(12) United States Patent
Yang et al.

(10) Patent No.: US 12,550,160 B2
(45) Date of Patent: Feb. 10, 2026

(54) METHOD AND APPARATUS FOR PERFORMING RANDOM ACCESS PROCEDURE WITH PREAMBLE REPETITION IN WIRELESS COMMUNICATION SYSTEM

(71) Applicant: LG Electronics Inc., Seoul (KR)

(72) Inventors: Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 295 days.

(21) Appl. No.: 18/028,963

(22) PCT Filed: Sep. 29, 2021

(86) PCT No.: PCT/KR2021/013349
§ 371 (c)(1),
(2) Date: Mar. 28, 2023

(87) PCT Pub. No.: WO2022/071755
PCT Pub. Date: Apr. 7, 2022

(65) Prior Publication Data
US 2023/0337287 A1    Oct. 19, 2023

(30) Foreign Application Priority Data
Sep. 29, 2020    (KR) ........................ 10-2020-0127190

(51) Int. Cl.
*H04W 72/232*    (2023.01)
*H04W 16/28*    (2009.01)
(Continued)

(52) U.S. Cl.
CPC ......... *H04W 72/232* (2023.01); *H04W 16/28* (2013.01); *H04W 56/0015* (2013.01); *H04W 74/0833* (2013.01); *H04W 74/0836* (2024.01)

(58) Field of Classification Search
CPC ............. H04W 74/0833; H04W 16/28; H04W 56/0015; H04W 72/232; H04W 74/0836;
(Continued)

(56) References Cited

U.S. PATENT DOCUMENTS 10,470,221 B2 *  11/2019  Yang ..................... H04W 72/21
10,820,355 B2 *  10/2020  Hui ...................... H04W 74/085
(Continued)

FOREIGN PATENT DOCUMENTS

KR    10-2019-0138675 A    12/2019
WO    2019/099443 A1    5/2019

OTHER PUBLICATIONS

Office Action in Korean Appln. No. 10-2023-7011346, mailed on Nov. 7, 2025, 11 pages (with English translation).

*Primary Examiner* — Mounir Moutaouakil
(74) *Attorney, Agent, or Firm* — Fish & Richardson P.C.

(57) ABSTRACT

The present disclosure relates to a wireless communication system and particularly to a method and an apparatus therefor, the method comprising the steps of: transmitting an RA preamble on one RO among a plurality of ROs, wherein, on ROs in a first RO group among a plurality of RO groups, a plurality of RA preambles having the same index are transmitted; receiving, on the basis of having transmitted the plurality of RA preambles, RAR by monitoring a plurality of PDCCH search spaces linked to the first RO group; and transmitting an uplink signal corresponding to the RAR, wherein a time resource of each PDCCH search space linked to the first RO group is linked to each RO of the first RO group.

9 Claims, 17 Drawing Sheets

(51) Int. Cl.
*H04W 56/00* (2009.01)
*H04W 74/0833* (2024.01)
*H04W 74/0836* (2024.01)

(58) Field of Classification Search
CPC ........... H04W 72/0446; H04W 72/046; H04W 72/23; H04W 74/004; H04W 74/006; H04B 7/088
See application file for complete search history.

(56) References Cited

U.S. PATENT DOCUMENTS

| | | | |
|---|---|---|---|
| 12,048,026 B2* | 7/2024 | Ren | H04W 56/001 |
| 2017/0013643 A1* | 1/2017 | Nan | H04W 74/006 |
| 2017/0141833 A1* | 5/2017 | Kim | H04W 24/08 |
| 2018/0160448 A1* | 6/2018 | Blankenship | H04W 74/0833 |
| 2020/0137806 A1 | 4/2020 | Islam et al. | |
| 2020/0281025 A1* | 9/2020 | Huang | H04W 74/0838 |
| 2020/0329506 A1* | 10/2020 | Liu | H04W 72/0453 |
| 2020/0351947 A1* | 11/2020 | Lei | H04L 27/2607 |
| 2022/0183076 A1* | 6/2022 | Lee | H04W 72/0473 |
| 2023/0122950 A1* | 4/2023 | Wei | H04W 72/232 |
| | | | 370/329 |

* cited by examiner

METHOD AND APPARATUS FOR PERFORMING RANDOM ACCESS PROCEDURE WITH PREAMBLE REPETITION IN WIRELESS COMMUNICATION SYSTEM

CROSS-REFERENCE TO RELATED APPLICATIONS

This application is a National Stage application under 35 U.S.C. § 371 of International Application No. PCT/KR2021/013349, filed on Sep. 29, 2021, which claims the benefit of Korean Patent Application No. 10-2020-0127190, filed on Sep. 29, 2020. The disclosures of the prior applications are incorporated by reference in their entirety.

TECHNICAL FIELD

The present disclosure relates to a wireless communication system, and more particularly, to a method and apparatus for transmitting and receiving a wireless signal.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An aspect of the present disclosure is to provide a method and apparatus for efficiently transmitting and receiving a wireless signal.

It will be appreciated by persons skilled in the art that the objects that could be achieved with the present disclosure are not limited to what has been particularly described hereinabove and the above and other objects that the present disclosure could achieve will be more clearly understood from the following detailed description.

According to a first aspect of the present disclosure, a method of performing a random access (RA) procedure by a user equipment (UE) in a wireless communication system includes: transmitting RA preambles having a same index on random access channel occasions (ROs) in a first RO group among RO groups; based on the RA preambles being transmitted, receiving a random access response (RAR) by monitoring Physical Downlink Control Channel (PDCCH) search spaces associated with the first RO group; and transmitting an uplink signal corresponding to the RAR, wherein a time resource of each PDCCH search space associated with the first RO group is associated with each RO in the first RO group.

According to a second aspect of the present disclosure, a user equipment (UE) used in a wireless communication system includes at least one radio frequency (RF) unit, at least one processor, and at least one computer memory operatively connected to the at least one processor and configured to cause the at least one processor to perform an operation when executed, wherein the operation includes: transmitting RA preambles having a same index on random access channel occasions (ROs) in a first RO group among RO groups; based on the RA preambles being transmitted, receiving a random access response (RAR) by monitoring Physical Downlink Control Channel (PDCCH) search spaces associated with the first RO group; and transmitting an uplink signal corresponding to the RAR, wherein a time resource of each PDCCH search space associated with the first RO group is associated with each RO in the first RO group.

According to a third aspect of the present disclosure, a device for a user equipment (UE) includes at least one processor, and at least one computer memory operatively connected to the at least one processor and configured to cause the at least one processor to perform an operation when executed, wherein the operation includes: transmitting RA preambles having a same index on random access channel occasions (ROs) in a first RO group among RO groups; based on the RA preambles being transmitted, receiving a random access response (RAR) by monitoring Physical Downlink Control Channel (PDCCH) search spaces associated with the first RO group; and transmitting an uplink signal corresponding to the RAR, wherein a time resource of each PDCCH search space associated with the first RO group is associated with each RO in the first RO group.

According to a fourth aspect of the present disclosure, a computer-readable recording medium including at least one computer program for causing at least one processor to perform an operation when executed, the operation is provided. The operation includes: transmitting RA preambles having a same index on random access channel occasions (ROs) in a first RO group among RO groups; based on the RA preambles being transmitted, receiving a random access response (RAR) by monitoring Physical Downlink Control Channel (PDCCH) search spaces associated with the first RO group; and transmitting an uplink signal corresponding to the RAR, wherein a time resource of each PDCCH search space associated with the first RO group is associated with each RO in the first RO group.

According to a fifth aspect of the present disclosure, a method of performing a random access (RA) procedure by a base station (BS) in a wireless communication system includes: receiving RA preambles having a same index on random access channel occasions (ROs) in a first RO group among RO groups; based on the RA preambles being received, transmitting a random access response (RAR) on Physical Downlink Control Channel (PDCCH) search spaces associated with the first RO group; and receiving an uplink signal corresponding to the RAR, wherein a time resource of each PDCCH search space associated with the first RO group is associated with each RO in the first RO group.

According to a sixth aspect of the present disclosure, a base station (BS) used in a wireless communication system includes at least one radio frequency (RF) unit, at least one processor, and at least one computer memory operatively connected to the at least one processor and configured to cause the at least one processor to perform an operation when executed, wherein the operation includes: receiving RA preambles having a same index on random access channel occasions (ROs) in a first RO group among RO groups; based on the RA preambles being received, transmitting a random access response (RAR) on Physical Downlink Control Channel (PDCCH) search spaces associated with the first RO group; and receiving an uplink signal corresponding to the RAR, wherein a time resource of each PDCCH search space associated with the first RO group is associated with each RO in the first RO group.

Based on RARs being received in PDCCH search spaces associated with the first RO group, the uplink signal is transmitted only for one RAR corresponding to an RO associated with a Synchronization Signal Block (SSB) having most excellent reception quality among the RARs.

One RO group includes M ROs that are associated with M SSB indexes and Time Division Multiplexed (TDMed) with each other.

Each RO group corresponds to a reception beam sweep section of a Base Station (BS), and each RO belonging to one RO group corresponds to each reception beam of the BS.

According to the present disclosure, a wireless signal may be transmitted and received efficiently in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 7 illustrates an RO;

DETAILED DESCRIPTION

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive machine type communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
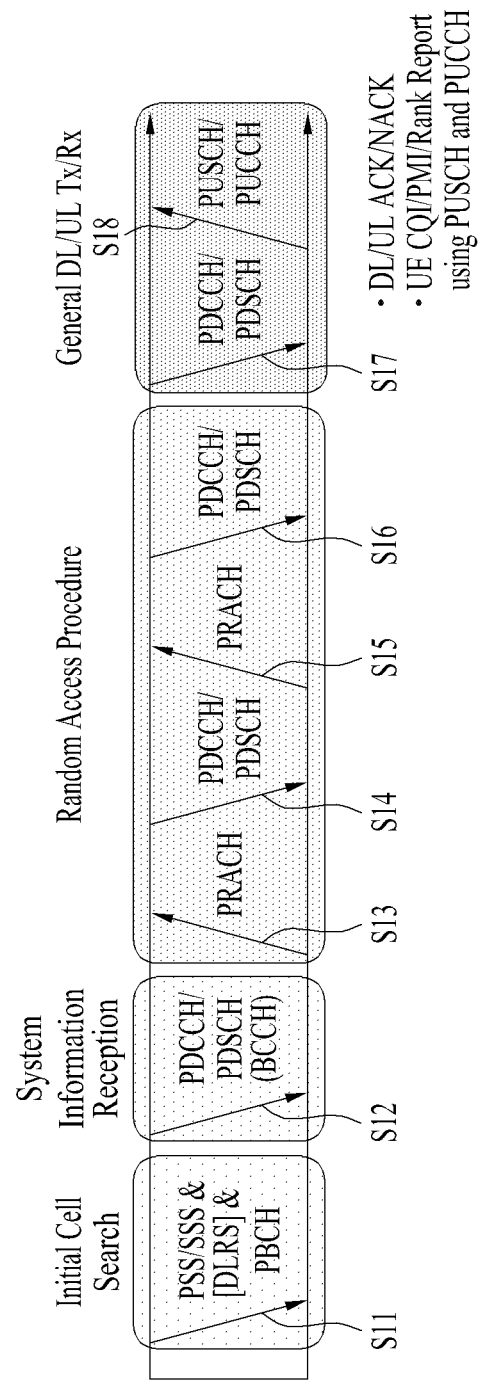
FIG. 1 illustrates physical channels used in a 3rd generation partnership project (3GPP) system as an exemplary wireless communication system and a general signal transmission method using the same.

FIG. 1 illustrates physical channels used in a 3GPP NR system and a general signal transmission method using the same.

When powered on or when a UE initially enters a cell, the UE performs initial cell search involving synchronization with a BS in step S101. For initial cell search, the UE receives synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
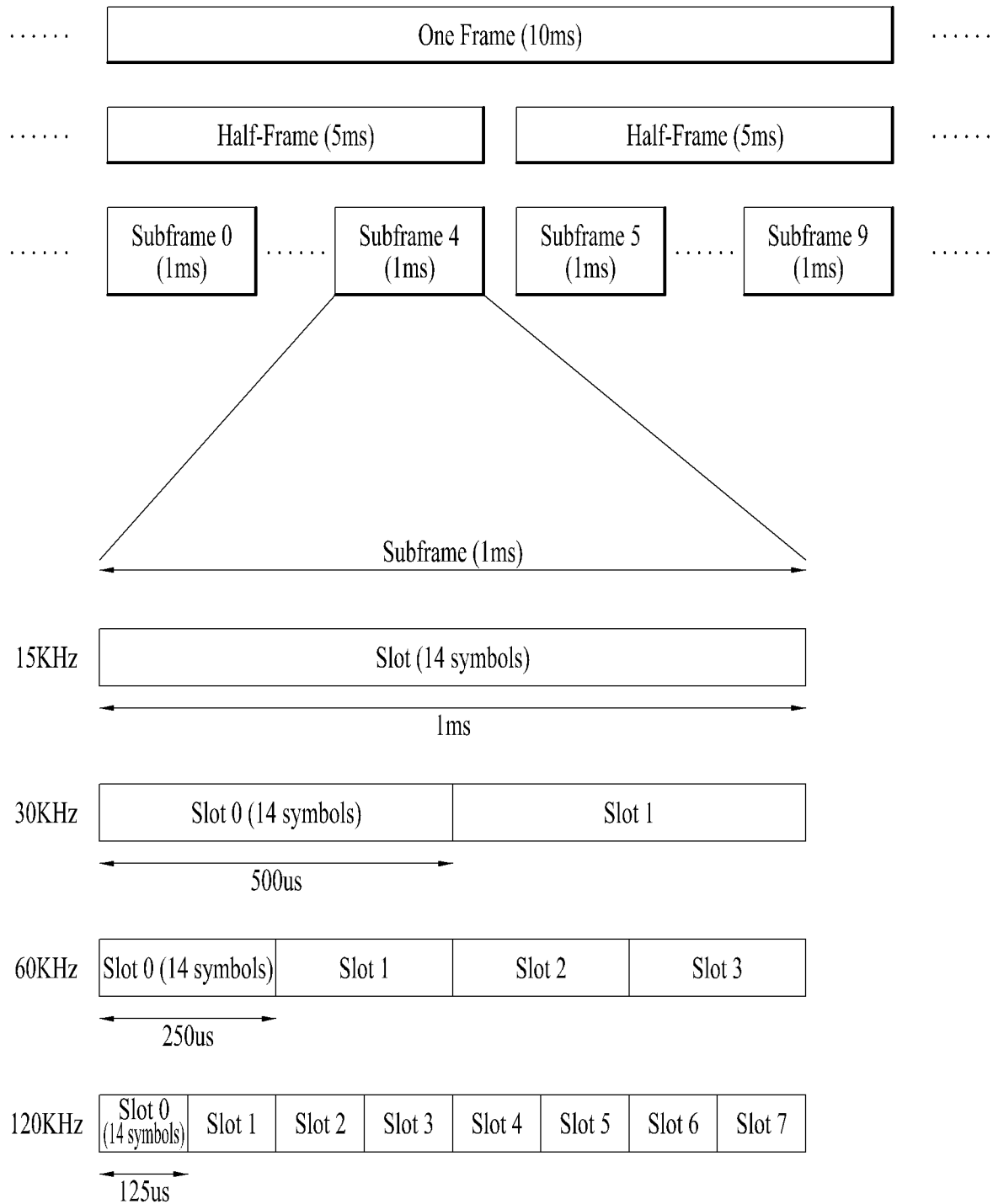
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 orthogonal frequency division multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15 * 2^u) | $N^{slot}_{symb}$ | $N^{frame,\mu}_{slot}$ | $N^{subframe,\mu}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N^{slot}_{symb}$: Number of symbols in a slot
$N^{frame,\mu}_{slot}$: Number of slots in a frame
$N^{subframe,\mu}_{slot}$: Number of slots in a subframe Table 2 illustrates that the number of symbols per slot, the number of slots per frame, and the number of slots per subframe vary according to the SCS when the extended CP is used.

TABLE 2

| SCS (15 * 2^u) | $N^{slot}_{symb}$ | $N^{frame,\mu}_{slot}$ | $N^{subframe,\mu}_{slot}$ |
|---|---|---|---|
| 60 KHz (u = 2) | 12 | 40 | 4 |

The frame structure is merely an example. The number of subframes, the number of slots, and the number of symbols in a frame may vary.

In the NR system, different OFDM numerologies (e.g., SCSs) may be configured for a plurality of cells aggregated for one UE. Accordingly, the (absolute time) duration of a time resource including the same number of symbols (e.g., a subframe (SF), slot, or TTI) (collectively referred to as a time unit (TU) for convenience) may be configured to be different for the aggregated cells. A symbol may be an OFDM symbol (or CP-OFDM symbol) or an SC FDMA symbol (or a discrete Fourier transform-spread-OFDM (DFT-s-OFDM) symbol).

Figure 3:
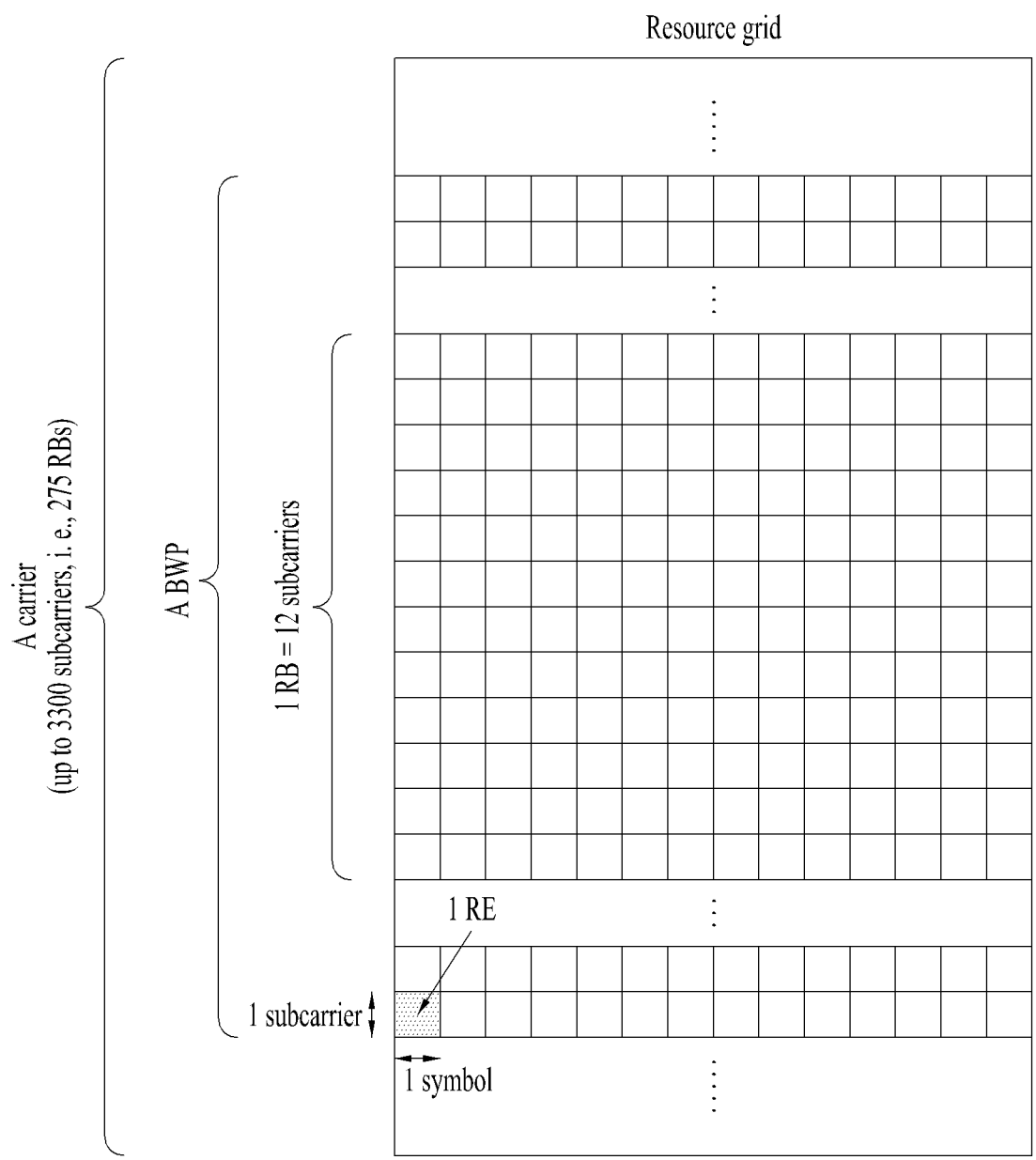
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
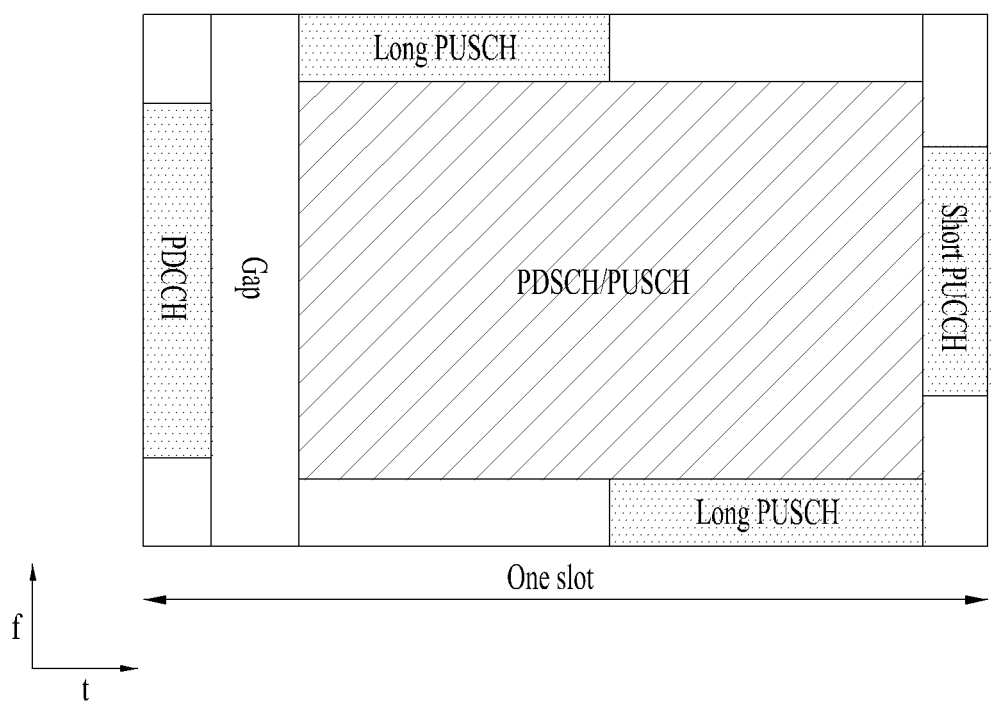
FIG. 4 illustrates mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PDCCH). Each of N and M is an integer equal to or larger than 0. A resource region (hereinafter, referred to as a data region) between the DL control region and the UL control region may be used to transmit DL data (e.g., PDSCH) or UL data (e.g., PDSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

Hereinafter, each physical channel will be described in detail.

The PDCCH carries downlink control information (DCI). For example, the PCCCH (i.e., DCI) carries a transmission format and resource allocation of a downlink shared channel (DL-SCH), resource allocation information about an uplink shared channel (UL-SCH), paging information about a paging channel (PCH), system information present on the DL-SCH, resource allocation information about a higher layer control message such as a random access response transmitted on a PDSCH, a transmit power control command, and activation/release of configured scheduling (CS). The DCI includes a cyclic redundancy check (CRC). The CRC is masked/scrambled with different identifiers (e.g., radio network temporary identifier (RNTI)) according to the owner or usage of the PDCCH. For example, if the PDCCH is for a specific UE, the CRC will be masked with a UE identifier (e.g., cell-RNTI (C-RNTI)). If the PDCCH is for paging, the CRC will be masked with a paging-RNTI (P-RNTI). If the PDCCH is for system information (e.g., a system information block (SIB)), the CRC will be masked with a system information RNTI (SI-RNTI). If the PDCCH is for a random access response, the CRC will be masked with a random access-RNTI (RA-RNTI).

PDCCH is configured with 1, 2, 4, 8, or 16 Control Channel Elements (CCEs) depending on an Aggregation Level (AL). CCE is a logical allocation unit used to provide PDCCH of a prescribed coding rate according to a radio channel state. CCE is configured with 6 Resource Element Groups (REGs). REG is defined as a single PFDM symbol and a single (P)RB. PDCCH is transmitted through a Control Resource Set (CORESET). CORESET is defined as an REG set having a given numerology (e.g., SCS, CP length, etc.). A plurality of CORESETs for a single UE may overlap in time/frequency domain. CORESET may be configured through system information (e.g., Master Information Block (MIB)) or UE-specific higher layer (e.g., Radio Resource Control (RRC) layer) signaling. Specifically, the number of RBs and the number of OFDM symbols (maximum 3) configuring CORESET may be set by higher layer signaling.

For PDCCH reception/detection, a UE monitors PDCCH candidates. A PDCCH candidate represents CCE(s) a UE should monitor for PDCCH detection. Each PDCCH candidate is defined as 1, 2, 4, 8, or 16 CCEs depending on AL. Monitoring includes (blinding) decoding PDCCH candidates. A set of PDCCH candidates monitored by a UE is defined as a PDCCH Search Space (SS). A search space includes a Common Search Space (CSS) or a UE-specific Search Space (USS). A UE may obtain DCI by monitoring a PDCCH candidate in one or more search spaces configured by MIB or higher layer signaling. Each CORESET is associated with one or more search spaces, and each search space is associated with a single CORESET. A search space may be defined based on the following parameters.

controlResourceSetId: This indicates CORESET related to a search space.
monitoringSlotPeriodicityAndOffset: This indicates PDCCH monitoring periodicity (slot unit) and PDCCH monitoring period offset (slot unit).
monitoringSymbolsWithinSlot: This indicates PDCCH monitoring symbols within a slot (e.g., first symbol(s) of CORESET).
nrofCandidates: This indicates the number ((0, 1, 2, 3, 4, 5, 6, or 8) of PDCCH candidates per AL={1, 2, 4, 8, 16}.

An occasion (e.g., Time/frequency resource) on which PDCCH candidates should be monitored is defined as a PDCCH (monitoring) occasion.

Table 3 illustrates features per search space type.

Table 4 illustrates DCI formats transmitted on PDCCH.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule TB-based (or TB-level) PUSCH, and DCI format 0_1 may be used to schedule TB-based (or TB-level) PUSCH or Code Block Group-based (CBG-based) (or CBG-level) PUSCH. DCI format 1_0 may be used to schedule TB-based (or TB-level) PDSCH, and DCI format 1_1 may be used to schedule TB-based (or TB-level) PDSCH or CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or UL scheduling information. DCI format 2_0 may be used to transmit dynamic slot format information (e.g., dynamic SFI) to a UE, and DCI format 2_1 may be used to transmit downlink pre-emption information to the UE. DCI format 2_0 and/or DCI format 2_1 may be transmitted to UEs in a corresponding group through a group common PDCCH, which is a PDCCH that is transmitted to UEs defined as one group. DCI format 0_0 and DCI format 1_0 may be referred to as fallback DCI format, and DCI format 0_1 and DCI format 1_1 may be referred to as non-fallback DCI format. The fallback DCI format maintains the same DCI size/field configuration irrespective of UE configuration. On the other hand, in the non-fallback DCI format, the DCI size/field configuration varies according to UE settings.

PDSCH carries downlink data (e.g., DL-SCH Transport Block (DL-SCHTB)), and modulation methods such as Quadrature Phase Shift Keying (QPSK), 16 Quadrature

TABLE 3

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Amplitude Modulation (QAM), 64 QAM, 256 QAM and the like are applied. A codeword is generated by encoding a TB. The PDSCH may carry up to two codewords. Scrambling and modulation mapping are performed for each codeword, and modulation symbols generated from each codeword may be mapped into one or more layers. Each layer is mapped to a resource together with a Demodulation Reference Signal (DMRS), generated as an OFDM symbol signal, and transmitted through a corresponding antenna port.

PUCCH carries Uplink Control Information (UCI). The UCI includes the following.

Scheduling Request (SR): Information used to request a UL-SCH resource.

Hybrid Automatic Repeat request-Acknowledgement (HARQ-ACK): This is a response to a downlink data packet (e.g., codeword) on PDSCH and indicates whether the downlink data packet has been successfully received. 1-bit HARQ-ACK may be transmitted in response to a single codeword, and 2-bit HARQ-ACK may be transmitted in response to two codewords. The HARQ-ACK response includes a positive ACK (simply, ACK), a negative ACK (NACK), or a DTX or NACK/DTX. Here, HARQ-ACK is used with HARQ ACK/NACK or ACK/NACK.

Channel State Information (CSI): Feedback information on a downlink channel.

Multiple Input Multiple Output-related (MIMO-related) feedback information includes a Rank Indicator (RI) and a Precoding Matrix Indicator (PMI).

Table 5 illustrates PUCCH formats. Short PUCCH (formats 0 and 2) and Long PUCCH (formats 1, 3, and 4) may be classified according to PUCCH transmission lengths.

TABLE 5

| PUCCH format | Length in OFDM symbols $N^{PUCCH}_{symb}$ | Number of bits | Usage | Etc |
|---|---|---|---|---|
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI with a maximum size of 2 bits, and is mapped and transmitted based on a sequence. Specifically, a UE transmits one of a plurality of sequences through PUCCH which is a PUCCH format 0 to transmit a specific UCI to a BS. The UE transmits PUCCH, which is PUCCH format 0, in a PUCCH resource for a corresponding SR configuration only when transmitting a positive SR.

PUCCH format 1 carries a UCI of up to 2 bits in size, and a modulation symbol is spread in a time domain by an Orthogonal Cover Code (OCC) (configured differently depending on frequency hopping). DMRS is transmitted in a symbol where the modulation symbol is not transmitted (i.e., transmitted over Time Division Multiplexing (TDM)).

PUCCH format 2 carries a UCI of a bit size greater than 2 bits, and a modulation symbol is transmitted by being FDMed (frequency division multiplexed) with DMRS. DM-RS is located at symbol indexes #1, #4, #7, and #10 in a resource block given with a density of ⅓. A Pseudo Noise (PN) sequence is used for a DM_RS sequence. Frequency hopping may be activated for a two-symbol PUCCH format 2.

PUCCH format 3 does not perform UE-multiplexing within the same physical resource blocks and carries a UCI having a bit size greater than 2 bits. In other words, a PUCCH resource of PUCCH format 3 does not include an orthogonal cover code. A modulation symbol is transmitted by being TDMed (time division multiplexed) with a DMRS.

PUCCH format 4 supports multiplexing of up to four UEs within the same physical resource blocks, and carries a UCI with a bit size greater than 2 bits. In other words, a PUCCH resource of PUCCH format 3 includes an orthogonal cover code. A modulation symbol is transmitted by being TDMed (time division multiplexed) with a DMRS.

PUSCH carries uplink data (e.g., UL-SCH Transport Block (UL-SCHTB)) and/or uplink control information (UCI), and is transmitted based on a Cyclic Prefix-Orthogonal Frequency Division Multiplexing (CP-OFDM) waveform or Discrete Fourier Transform-spread-Orthogonal Frequency Division Multiplexing (DFT-s-OFDM) waveform. When PUSCH is transmitted based on DFT-s-OFDM waveform, a UE transmits the PUSCH by applying transform precoding. For example, if transform coding is impossible (e.g., transform precoding is disabled), a UE may transmit PUSCH based on CP-OFDM waveform. If transform coding is possible (e.g., transform precoding is enabled), a UE may transmit PUSCH based on CP-OFDM waveform or DFT-s-OFDM waveform. PUSCH transmission may be dynamically scheduled by UL grant in DCI or semi-statically scheduled based on higher layer (e.g., RRC) signaling (and/or Layer 1 (L1) signaling (e.g., PDCCH)) (configured grant). PUSCH transmission may be performed based on a codebook or a non-codebook.

Figure 5:
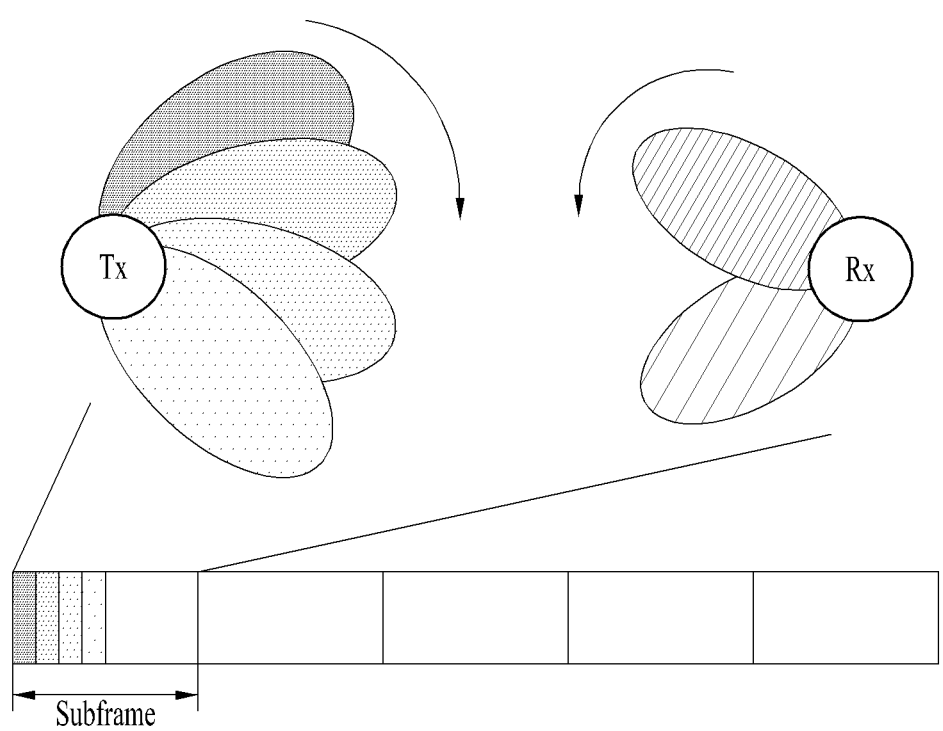
FIG. 5 illustrates analog beamforming.
Figure 14:
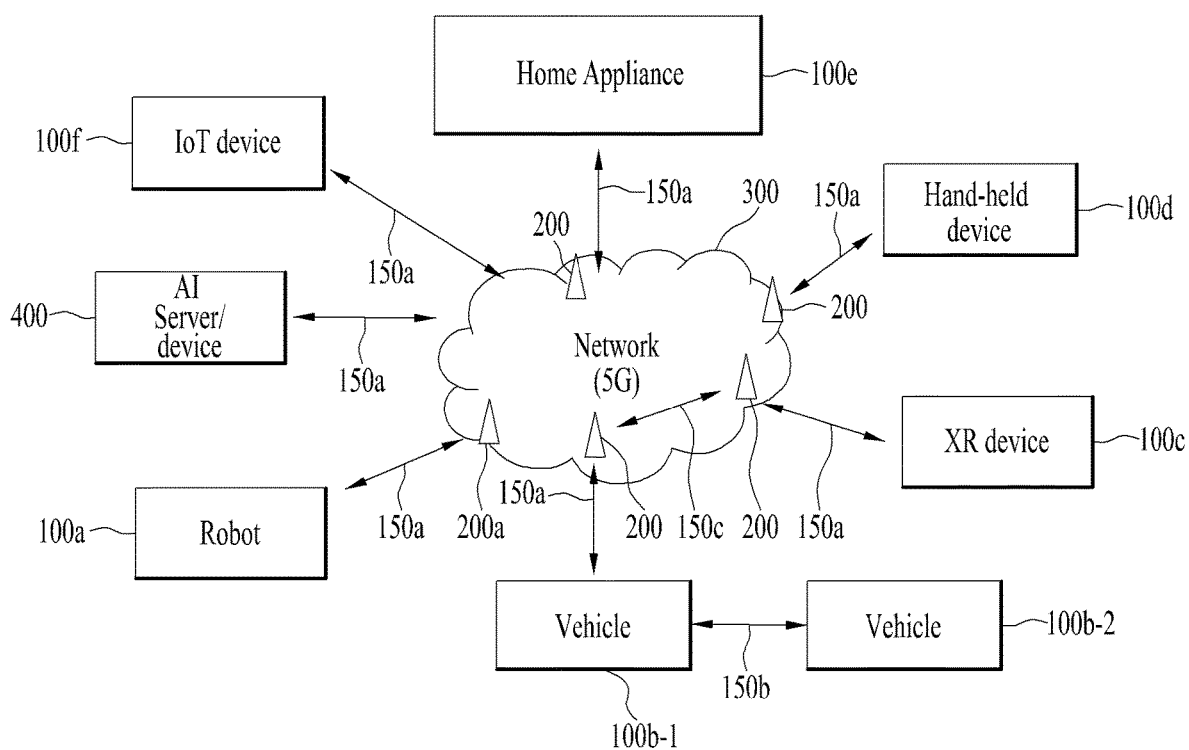
FIGS. 14 to 17 illustrate a communication system 1 and wireless devices applied to the present disclosure.

FIG. 5 illustrates analog beamforming. Referring to FIG. 14, a transmitter may transmit a signal while changing a direction of the beam over time (transmit beamforming). A receiver may also receive a signal while changing a direction of the beam over time (receive beamforming). Within a certain time interval, (i) directions of the transmit and receive beams may change simultaneously over time, (ii) a direction of the transmit beam may be fixed over time, while only a direction of the receive beam may change over time, or (iii) a direction of the receive beam may be fixed over time, while only a direction of the transmit beam may change over time.

A UE may perform cell search, system information acquisition, beam alignment for initial access, DL measurement, and the like based on the SSB. The SSB is interchangeably used with a Synchronization Signal/Physical Broadcast channel (SS/PBCH) block. The SSB includes a PSS, an SSS, and a PBCH. The SSB includes four consecutive OFDM symbols, and the PSS, the PBCH, the SSS/PBCH, and the PBCH are transmitted for each OFDM symbol. The SSB is transmitted periodically according to SSB periodicity. A basic SSB period assumed by the UE during initial cell search is 20 ms. After cell access, the SSB periodicity may be configured to one of {5 ms, 10 ms, 20 ms, 40 ms, 80 ms, and 160 ms} by a network (e.g., BS). At the beginning of the SSB periodicity, an SSB burst set is formed. The SSB burst set includes a 5 ms time window (i.e., half-frame), and within the SSB burst set, the SSB may be transmitted up to L times.

Figure 6:
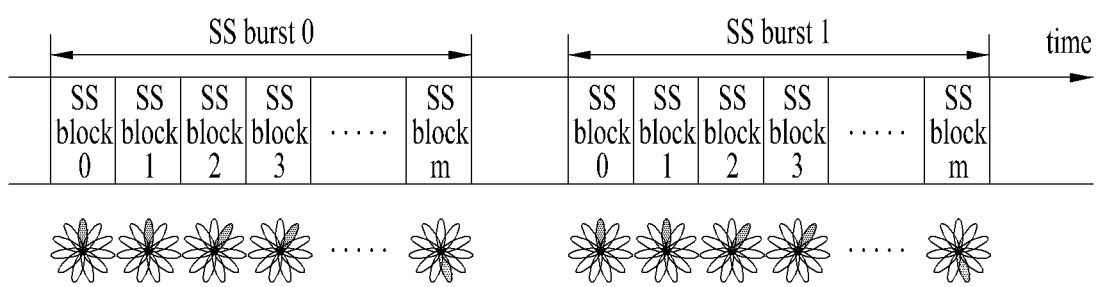
FIG. 6 illustrates exemplary multi-beam transmission of SSBs.

FIG. 6 illustrates exemplary multi-beam transmission of SSBs. Beam sweeping refers to changing the beam (direction) of a wireless signal over time at a transmission reception point (TRP) (e.g., a BS/cell) (hereinbelow, the terms beam and beam direction are interchangeably used). An SSB may be transmitted periodically by beam sweeping. In this case, SSB indexes are implicitly linked to SSB beams. An SSB beam may be changed on an SSB (index) basis. The maximum transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range of up to 3 GHz, Max number of beams=4

For frequency range from 3 GHz to 6 GHz, Max number of beams=8

For frequency range from 6 GHz to 52.6 GHz, Max number of beams=64

Without multi-beam transmission, the number of SSB beams is 1.

Figure 7:
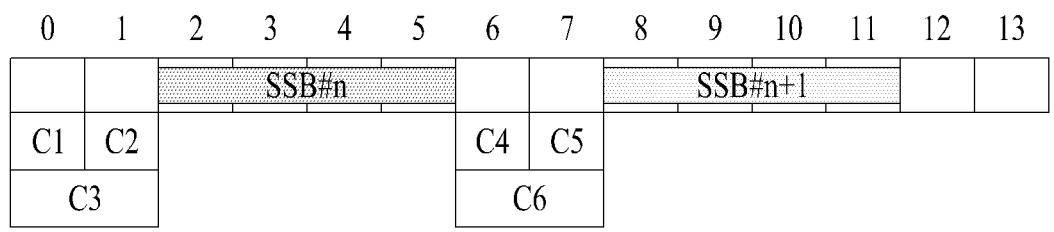
FIG. 7 illustrates exemplary SSB transmission and CORESET configuration.

FIG. 7 illustrates exemplary SSB transmission and CORESET configuration. Referring to FIG. 7, a CORESET corresponding to SSB may be configured. For example, A CORESET corresponding to SSB #n may be configured as a 1-symbol CORESET C1 and/or C2 in symbol #0 and/or symbol #1 and/or a 2-symbol CORESET C3 in symbols #0 and #1. Further, a CORESET corresponding to SSB #n+1 may be configured as a 1-symbol CORESET C4 and/or C5 in symbol #6 and/or symbol #7 and/or a 2-symbol CORE-SET C6 in symbols #6 and #7.

Figure 8:
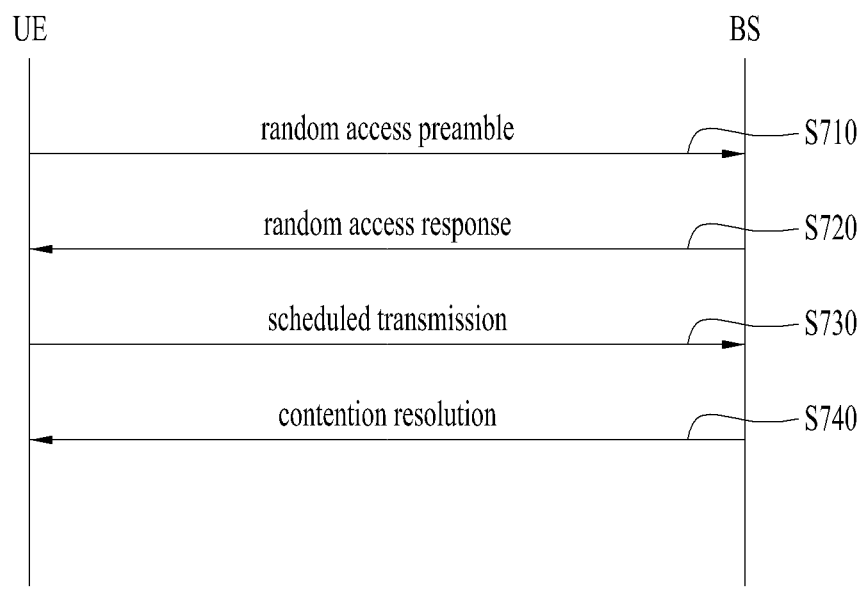
FIG. 8 illustrates a 4-step Random Access Channel (RACH) process.

FIG. 8 illustrates a 4-step RACH process. Referring to FIG. 8, a signal/information transmitted through each step and a detailed operation performed in each step are as follows.

1) Msg1 (PRACH): This is transmitted from a UE to a BS (S710). Each Msg1 may be divided into a time/frequency resource (RACH Occasion (RO)), on which a Random Access (RA) preamble is transmitted, and a preamble index (RA Preamble Index (RAPID)).

2) Msg2 (RAR PDSCH): This is a response message to the Msg1 and is transmitted from the BS to the UE (S720). For Msg2 reception, the UE may perform PDCCH monitoring to check whether there is RA-RNTI-based PDCCH (e.g., CRC of PDCCH is masked with RA-RNTI) within a time window (hereinafter, RAR window) related to the Msg1. When the PDCCH masked with the RA-RNTI is received, the UE may receive an RAR from PDSCH indicated by the RA-RNTI PDCCH. The RA-RNTI may be determined as follows.

3) Msg3 (PUSCH): This is transmitted from the UE to the BS (S730). Msg3 is performed based on the UL grant in the RAR. The Msg3 may include a contention resolution Identity (ID) (and/or Buffer Status Report (BSR) information, RRC connection request, etc.). Retransmission according to an HARQ process may be applied to the Msg3 (PUSCH). Here, the contention resolution ID includes a UL Common Control Channel (UL CCCH) Service Data Unit (SDU). When the UL CCCH SDU is greater than 48 bits, only the first 48 bits of the UL CCCH SDU may be included in the Msg3.

4) Msg4 (PDSCH): This is transmitted from the BS top the UE (S740). Msg4 may include a UE (global) ID (and/or RRC connection-related information) for contention resolution. Success or failure in contention resolution may be determined based on the Msg4.

If the Msg2/Msg4 is not successfully received, the UE retransmits the Msg1. In doing so, the UE increases the transmission power of the Msg1 (power ramping), and increases an RACH retransmission counter value. When the RACH retransmission counter value reaches the maximum value, it is determined that the RACH procedure has completely failed. In this case, after performing a random back-off, the UE may initialize an RACH-related parameter (e.g., an RACH retransmission counter) to newly start the RACH process.

Figure 9:
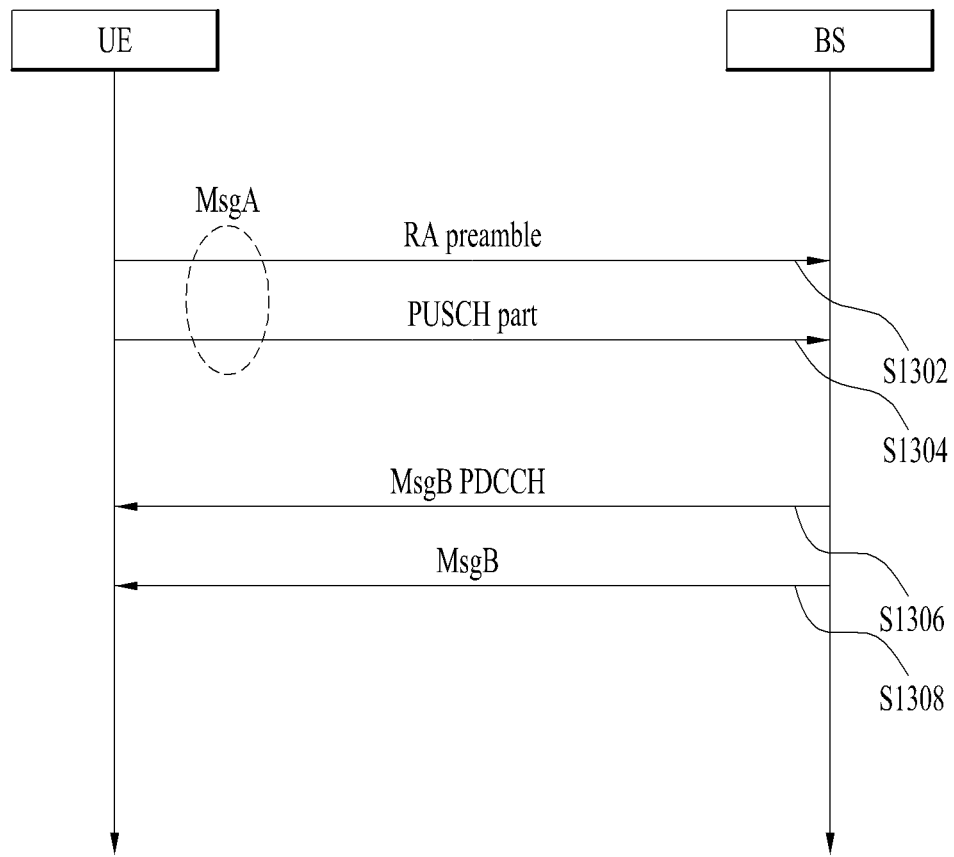
FIG. 9 illustrates a 2-step RACH process.

FIG. 9 illustrates a 2-step RACH process. Referring to FIG. 6, a UE may transmit a random access request message (e.g., MsgA) to a BS. The MsgA transmission includes a Random Access Preamble (RAP) transmission (S1302) and a PUSCH transmission (S1304). Thereafter, in order to receive a response (i.e., MsgB) to the MsgA, the UE may monitor a PDCCH within a time window related to RAP. Specifically, in order to receive the MsgB, the UE may receive a PDCCH (hereinafter, referred to as a MsgB PDCCH) for scheduling the MsgB in the time window (S1306), and may receive the MsgB based on it (S1308). To receive the MsgB PDCCH, the UE may monitor a specific RNTI-based PDCCH (e.g., a CRC of the PDCCH is masked with a specific-RNTI). Here, the PDCCH monitoring includes performing blind decoding on a PDCCH candidate. In addition, the specific RNTI may include an RA-RNTI. If the MsgB is not successfully received or/and fails in contention resolution, the UE may perform MsgA retransmission. Meanwhile, when the MsgB is received and contention resolution is successful, the RACH procedure is successfully completed. When the MsgB includes PUCCH resource allocation information for HARQ-ACK feedback transmission, the UE may transmit HARQ-ACK feedback on the MsgB reception using an allocated PUCCH resource. In addition, when the MsgB includes a TA command and PUSCH resource allocation information (e.g., UL grant), the UE may transmit a PUSCH based on the TA command and the PUSCH resource allocation information.

Embodiment: RACH Procedure

Until recently (over Rel-15 and Rel-16), 3GPP has standardized a 5G system named New RAT (hereinafter referred to as NR). The NR system aim to support multiple logical networks in a single physical system, and therefor is designed to support a service (e.g., eMBB, mMTC, and URLLC) with various requirements by operating/changing analog/hybrid beamforming operations considering various OFDM numerologies (e.g., an OFDM symbol interval, a SCS, and a CP length), a wide operating frequency range (up to approximately 50 GHz), and the characteristics of a high frequency band.

In the recent 3GPP Rel-17, a need for development of an NR (hereinafter, high frequency (HF) NR) system operating a high frequency band (e.g., corresponding to 60 to 70 GHz or higher) compared with the existing NR system based on 3GPP Rel-15/16 has been considered. In the case of the HF NR system, introduction and application of a new OFDM numerology based on a higher SCS (hereinafter a large SCS) (e.g., 240 KHz, 480 KHz, and 960 KHz) than an SCS of the existing NR (e.g., 15 KHz, 30 KHz, 60 KHz, and 120 KHz) may be considered in consideration of radio channel characteristics such as larger phase noise and/or larger Doppler shift due to a higher frequency, a wider bandwidth, and a higher frequency band than the existing NR.

When a large SCS is used in the HF NR system, an OFDM symbol and a slot period are reduced, and thus cell planning to manage/operate the system by reducing cell coverage may be considered. However, otherwise, (e.g., cell coverage is maintained to correspond to the existing NR level, or the SCS of the system is increased from the existing NR SCS to a large SCS for the HF NR, but the cell coverage does not decrease in inverse proportion to the increase in SCS), coverage supplementation may be required for physical channel/signal transmission. Coverage supplementation refers to, for example, a method for extending/supplementing coverage in physical channel/signal processing to enable the DL physical channel/signal to reach a UE located at an edge/boundary of target cell coverage according to cell planning, or to enable a UL physical channel/signal transmitted from the UE located at the edge/boundary of the target cell coverage to reach a BS. In addition, since the CP length is reduced due to use of a large SCS, it may be necessary to consider an effect of delay spread and/or phase noise of a radio channel and/or beam switching time.

Hereinafter, the present disclosure proposes an RACH procedure considering the above-described communication environment. For example, the RACH process/operation method/apparatus proposed in the present disclosure may consider at least one of (i) HF NR operation, (ii) use of large SCS, and/or (iii) symbol length reduction. In detail, the present disclosure proposes an RACH procedure based on a RACH Occasion (RO) group. For example, the present disclosure proposes an RACH process/operation method based on an RO group configured with a plurality of RACH occasions (ROs) related to one or more SSBs (indexes) for PRACH transmission coverage supplementation considering OFDM symbol shortening due to use of large SCS, which is an HF NR system operating characteristic, and beam refinement/sweeping support considering beam quality degradation due to sharp multi-beam transmission. Although the following description focuses on 4-step RACH, the method proposed in the present disclosure may also be used for 2-step RACH.

Figure 10:
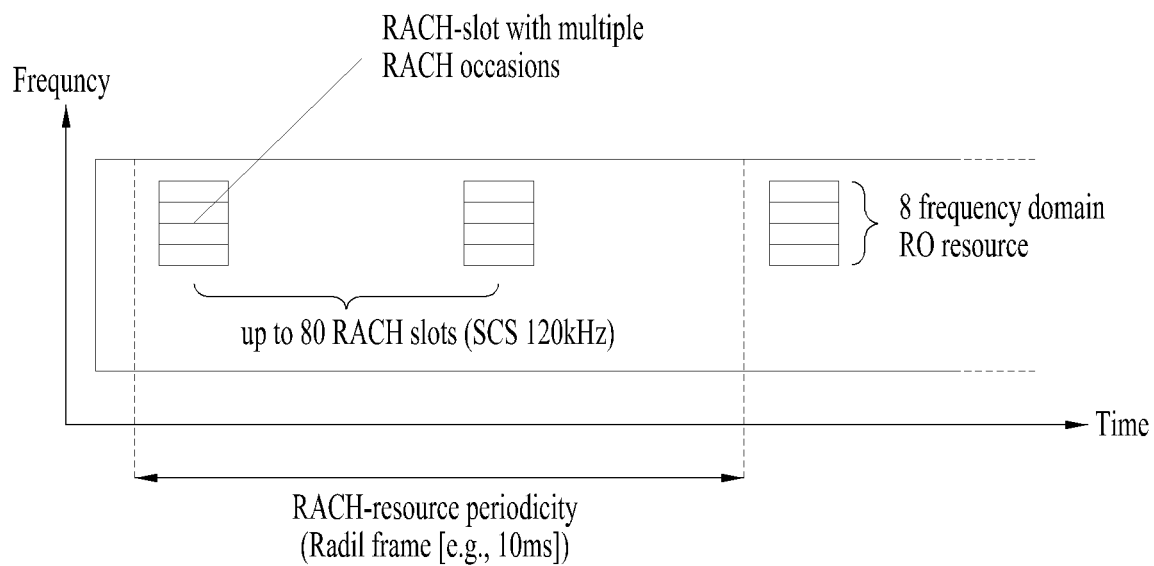

FIG. 10 illustrates a plurality of ROs (RACH Occasions) configured in an RACH resource interval. The RO may be referred to as a PRACH opportunity or RA-opportunity for short. The RO may mean time/frequency resource(s) capable of transmitting a PRACH (e.g., Msg1 or MsgA including an RA preamble) of the UE. In the case of SCS=120 kHz, up to 80 RACH slots may be configured within the RACH-resource period (e.g., 10 ms) in the time domain, and multiple (e.g., up to 8) RO frequency resources (e.g., RB) in the frequency domain may be configured. The RO may be defined as one RACH slot and one RACH frequency resource.

The UE may select one of a plurality of ROs and transmit a PRACH (i.e., RA preamble). When the PRACH is transmitted, the UE may monitor a PDCCH for scheduling a RAR (hereinafter, RAR PDCCH) within a RAR window (or an RA-window). The RAR window may start based on a RO transmission time (i.e., PRACH transmission time), and in detail, may start from a first PDCCH opportunity (e.g., a PDCCH search space) for RAR PDCCH monitoring that exists after the RO transmission time. A time interval of the RAR window may be adjusted based on a timer configured by a higher layer (e.g., RRC). While the RAR window (i.e., timer) is running, the UE may monitor the RAR PDCCH for each PDCCH search space, and when the RAR PDCCH for the UE is detected, the RAR window may be terminated. The RAR PDCCH may be identified by an RA-RNTI. In the case of 2-step RACH, the RAR may be replaced with MsgB, and the RA-RNTI may be replaced with MsgB-RNTI.

An RA-RNTI applied to a PDCCH that schedules an RAR in the existing 4-step RACH of 3GPP Rel-15/16 and a MsgB-RNTI applied to a PDCCH that schedules a MsgB in 2-step RACH thereof may be calculated/determined as a function of the following parameters to distinguish multiple ROs configured within a 10-ms period.

$$\text{RA-RNTI}=1+s+\{14*t\}+\{14*80*f\}+\{14*80*8*u\}$$

$$\text{MsgB-RNTI}=1+s+\{14*t\}+\{14*80*f\}+\{14*80*8*u\}+ \\ 14*80*8*2, \text{ where,} \quad \text{[Equation 1]}$$

RNTI is configured with 16 bits and has values ranging 0 to 65535, a first OFDM symbol index (s) of PRACH is $0 \le s < 14$, a first slot index (t) of PRACH in a radio frame is $0 \le t < 80$ (where t corresponds to a value in consideration of up to 120 KHz that is a maximum SCS value), a frequency domain RO index (f) is $0 \le f < 8$, and a UL carrier type/index (u) used for PRACH transmission is $0 \le u < 2$ (e.g., 0 for Normal Uplink (NUL) carrier, 1 for Supplementary Uplink (SUL) carrier).

RA-RNTI/MsgB-RNTI of Equation 1 may be generalized as follows. Definitions of parameters of Equation 2 may refer to Equation 1.

$$1+s+\{14*t\}+\{14*80*f\}+\{14*80*8*u\}+14*80*8*r, \\ \text{where,} \quad \text{[Equation 2]}$$

s is a symbol index and has a value ranging 0 to 13, t is a slot index and has a value ranging 0 to 79, f is a frequency resource index and has a value ranging 0 to 7, u is a value related to a carrier of the RA preamble and has a value of 0 or 1, and r may have 0 or 2 as a value for an RACH type. For example, when PRACH is transmitted through the 4-step RACH, r may be set to 0. On the other hand, when PRACH is transmitted through the 2-step RACH, r may be set to 2.

Meanwhile, in 3GPP Rel-17, the introduction of SCSs (e.g., 240 KHz, 480 KHz, and 960 KHz) larger than 120 KHz may be considered for the purpose of designing NR systems operating in higher frequency bands than before. In this case, the number of slots (indexes) in the 10-ms period may increase in proportion to the size of the SCS. For example, when a PRACH SRS is 480 KHz or 960 KHz, the number of slots (indexes) in the 10-ms period becomes 320 or 640, respectively. Here, the PRACH SCS refers to an SCS configured in a PRACH (or an RA preamble) or an SCS of a band/carrier/cell in which the corresponding PRACH (or RA preamble) transmission is performed. In this case, when calculated by the existing formula (see Equation 1), a maximum value of RA-RNTI becomes approximately 71680 or 143360, respectively, and a maximum value of MsgB-RNTI becomes approximately 143360 or 286720, respectively. For this reason, there occurs a problem in deviating from the range (0 to 65535) of values that the 16-bit RNTI may have.

Hereinafter, the RO group-based RACH procedure will be described in more detail. The following description will be described in terms of an RO group on the premise of the existing RACH process. Therefore, in the present disclosure, operations defined for the existing RACH procedure (e.g., FIGS. 8 to 10) may be referred to except for information specifically described in relation to the RO group.

First, an RO group type(s) for the RO group-based RACH procedure may be proposed. In the case of the RO group, for example, the following two types may be considered/configured (by the UE/BS). Considering possible combinations of UE TX beams (e.g., PRACH transmission, and Msg1 and/or MsgA transmission of the UE) and BS RX beams (e.g., PRACH reception, and Msg1 and/or MsgA reception of the BS) for each RO group type, the following three RO beam combinations may be considered/configured. The present disclosure is not limited to the following two RO group types. For example, an additional RO group type may be defined, or some of the RO group types described in the present disclosure may be replaced/omitted with other RO group types. Some combinations may form one RO group type.

Figure 11:
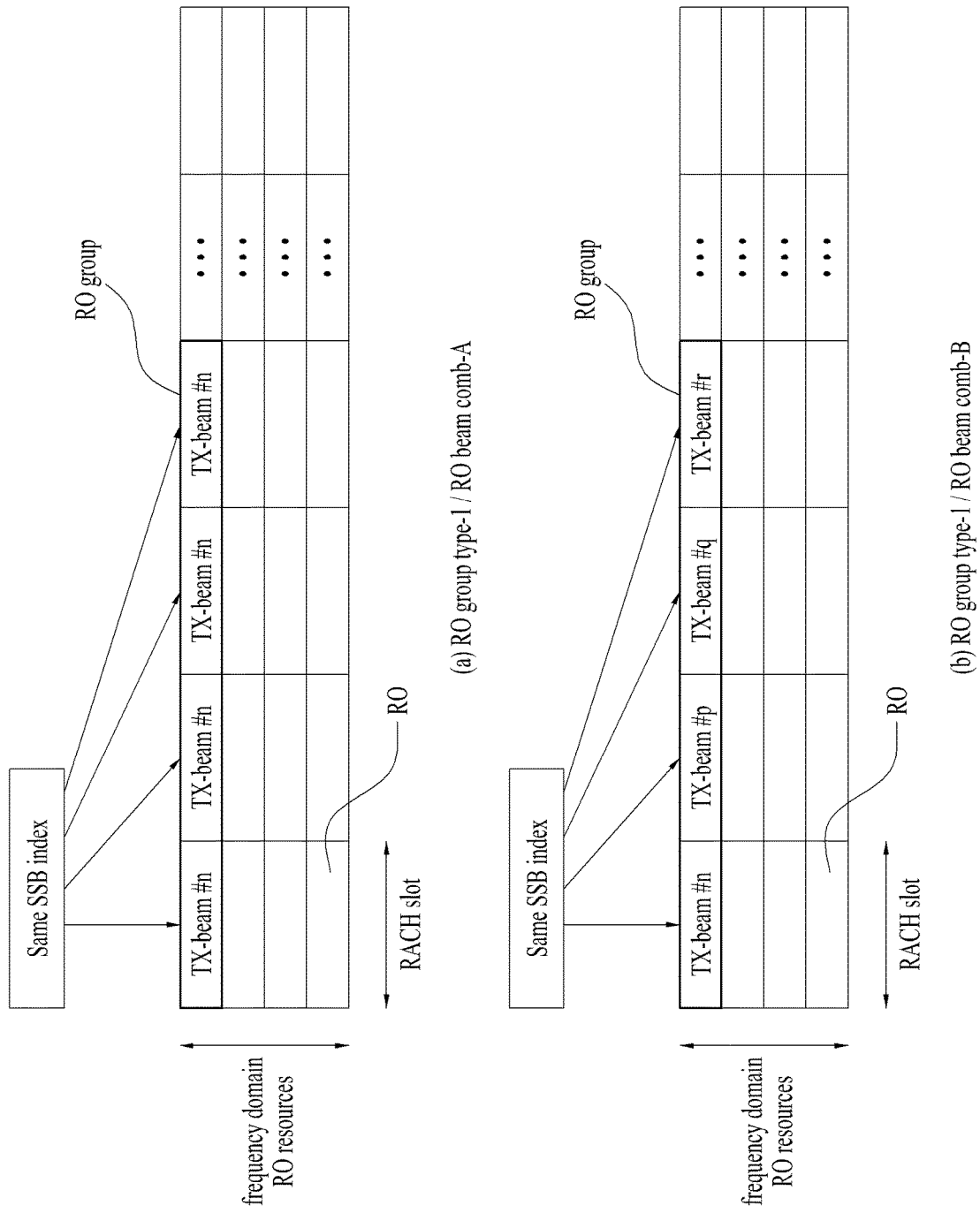
FIGS. 11 and 12 illustrate an RO group applicable to the present disclosure.
Figure 12:
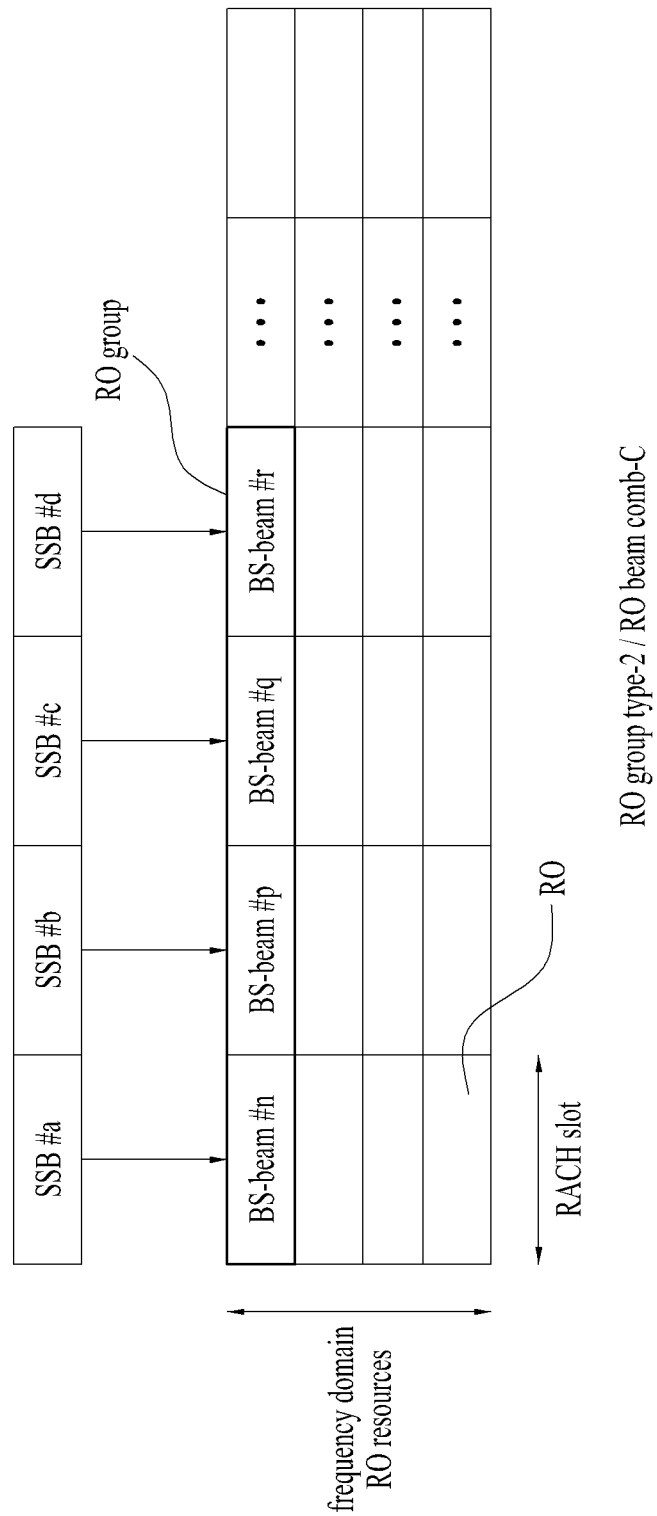

FIG. 11 illustrates RO group type-1, and FIG. 12 illustrates RO group type-2.

1) RO group type-1: Set of multiple (TDMed) ROs associated to the same SSB (index)
  A. RO beam comb-A: Structure in which UE TX beams are repeated within the RO group
    i. Beam structure: All ROs belonging to one RO group are transmitted using the same UE TX beam
    ii. Use case: Coverage enhancement support for PRACH transmission itself
  B. RO beam comb-B: Structure in which UE TX beams are swept within the RO group
    i. Beam structure: ROs are transmitted using different UE TX beams for respective ROs belonging to one RO group
    ii. Use case: Beam refinement support for UE without TX/RX beam correspondence
2) RO group type-2: Set of (TDMed) ROs associated to a plurality of different SSBs (indexes)
  A. RO beam comb-C: Structure in which BS RX beams are swept within the RO group
    i. Beam structure: ROs are received using different BS RX beams for respective ROs belonging to one RO group
    ii. Use case: Support for rapidly changing beam quality in high frequency bands Referring to FIGS. 11 and 12, the RO group type may be determined/configured based on whether the RO group is associated to a single SSB. RO group type-2 may be interpreted as meaning that it is not ensured that the RO group is associated to a single SSB, and the number of SSBs associated to the RO group may be configured in various ways. For example, as shown in FIG. 12, the number of ROs and the number of SSBs in the RO group may be associated to each other, but the same SSB may be commonly associated to some ROs in the RO group.

For example, according to RO beam comb-A, the UE may transmit (repeat) the same (beam-formed) PRACH for each RO in the RO group. Due to repeated PRACH transmission, there may be a possibility of successful PRACH transmission and an effect of improving coverage.

For example, according to RO beam comb-B, the Tx beam of the UE for PRACH transmission may be changed according to/based on each RO (or a specific RO pattern) within the RO group.

For example, according to RO beam comb-C, a BS that attempts PRACH detection on a first RO in the RO group may use a first RX beam and a BS that attempts PRACH detection on a second RO may use a second RX beam. The first RX beam and the second RX beam may be determined based on SSBs associated to the corresponding ROs, respectively.

The RO group type and/or RO beam combination information may be provided to the UE by the BS. For example, the RO group type and/or the RO beam combination information may be configured via system information (e.g., SIB) or RRC signaling, and for example, may be configured using the following method. The methods described below are exemplary and may be combined with each other within a range that does not conflict with each other.

1) Through SIB or RRC signaling, whether Alt 1) a set of M associated SSB indexes or Alt 2) associated SSB indexes are the same or (at least some) are different (i.e., whether the corresponding RO group type is an RO group type-1 or type-2) may be configured by the UE/BS for a size M of a single RO group and a plurality of (M) ROs belonging to each RO group (index).
  A. In addition, when all M SSB indexes are the same (i.e., RO group type-1) and whether the corresponding RO beam combination is RO beam comb-A or comb-B (i.e., whether TX beams used in transmission of a plurality of ROs belonging to the RO group are the same or different) may be additionally configured by the UE/BS.
2) When Alt 1 is applied, the UE/BS configures an RO group using the following method
  A. For each RO group configuration, the UE/BS may configure an RO group by grouping M earliest ROs (in terms of time) that are associated to M SSB indexes based on a specific (e.g., radio frame (SFN) start) time point and have a TDM relationship with each other (if a plurality of sets of M ROs exist over a plurality of frequencies, RO groups are sequentially configured (to have a low index) from a low-frequency RO set and may then configure an RO group by grouping M earliest ROs (from the lowest frequency RO set) under the same condition (i.e., SSB association and TDM allocation) (hereafter, RO grouping method A).
  B. If all M SSB indexes are set identically, the UE/BS may configure an RO group by grouping M earliest ROs (in terms of time) that are associated to the same configured SSB index and have a TDM relationship with each other (if a plurality of sets of M ROs exist over a plurality of frequencies, RO groups are sequentially configured (to have a low index) from a low-frequency RO set and may then configure an RO group by grouping M earliest ROs (from the lowest frequency RO set) under the same condition (i.e., SSB association and TDM allocation) (hereafter, RO grouping method B).
3) When Alt 2 is applied, the UE/BS configures an RO group using the following method
  A. When RO group type-2 is configured (i.e., associated SSB indexes are different), an RO group may be configured by applying the RO grouping method A to the M lowest SSB indexes and an RO group may be configured by applying the RO grouping method A again to the M lowest SSB indexes after (M corresponding SSB indexes).
  B. When RO group type-1 is configured (i.e., associated SSB indexes are the same), an RO group may be configured by applying the RO grouping method B to one lowest SSB index and an RO group may be configured by applying the RO grouping method B again to one lowest SSB index after (the corresponding SSB index).
  C. A and B may be an example of configuration of an RO group based on an SSB index and the proposal of the present disclosure is not limited thereto. For example, an RO group may be determined based on an RO grouping function using an SSB index as an input value.
4) In addition, when a plurality of RO group types (e.g., type-1/2) or a plurality of RO beam combinations (e.g., comb-A/B/C) are simultaneously configured via SIB or RRC signaling, the UE may select one RO group type or one RO beam combination based on reception quality (e.g., Reference Signals Received Power (RSRP)) of an SSB signal and may perform an RACH process.
  A. For example, for RO group type-1, when an RSRP of an SSB is less than a specific level (e.g., a first reference value), RO beam comb-A is selected, and when the RSRP of the SSB is equal to or greater than a specific level, RO beam comb-B is selected.
  B. In another example, for RO group type-1/2, when the RSRP of the SSB is less than a specific level (e.g., a second reference value), RO beam comb-A is selected, and when the RSRP of the SSB is equal to or greater than a specific level, RO beam comb-C is selected.
  C. In another example, for RO group type-1/2, when the RSRP of the SSB is less than a specific level (e.g., a third reference value), RO beam comb-B is selected, and when the RSRP of the SSB is equal to or greater than a specific level, RO beam comb-C is selected.
5. In addition, for a plurality of ROs belonging to the same RO group, the UE may operate to select/transmit the same PRACH preamble index (i.e., All preamble indexes of PRACH signals transmitted by a single UE through a plurality of ROs belonging to the same RO group may be selected to be the same.)
  A. A PRACH transmission signal in an RO group unit and the existing PRACH transmission signal in a single RO unit may be classified/configured as ROs at different time points (TDM type) (Alt A) or may be classified/configured using different PRACH preamble index sets in the state in which the (same) RO at the same time/frequency is configured (Alt C).

A combination of Alt 1/2 may be possible. For example, when it is indicated through Alt 2) information that SSB indexes associated with ROs of an RO group are different (type-2), and (additionally) through Alt 1) information, a set of M SSB indexes (or a list thereof) associated with the ROs of the RO group may be provided. A size M of the RO group may also be signaled/configured or predefined. For example, the size M of the RO group may be determined based on various parameters (e.g., SCS, (OFDM) symbol length, numerology, and/or HF frequency band), but is not limited thereto.

RAR Reception Operation

First, in the case of RO beam comb-A, the following methods may be considered/configured for a RAR reception operation (RAR window configuration therefor) of a UE corresponding to transmission of an RO group and determination of an RA-RNTI of a PDCCH for scheduling the corresponding RAR. In the following description, RAR may be replaced with MsgB in the case of 2-step RACH. The RAR reception method and/or determination of the RA-RNTI that are described below may be are exemplary and may be combined or omitted within a range that does not conflict with each other. For the RAR window configuration and the RAR window determination method, reference may be made to the description of FIG. 10 and Equation 1.
  1) RAR reception operation (RAR window configuration therefor)
    A. Option 1: The UE starts the RAR window based on a transmission time of the last (or first) RO belonging to the RO group (in terms of time) and receives an RAR (corresponding to the entire RO group). In the present disclosure, when the RAR window starts based on the RO transmission time point, this may mean that the RAR window starts from a first PDCCH monitoring occasion that exists after the RO transmission time point. Here, the PDCCH monitoring occasion means a PDCCH monitoring occasion for RAR PDCCH monitoring.
      i. Note: It may be possible to simply perform an RAR transmission/reception operation
    B. Option 2: The UE starts the RAR window based on each RO transmission time point for each of a plurality of ROs belonging to the RO group and receives an RAR (corresponding to each RO in the RO group)
      ii. Note: Latency reduction in early detection of BS for PRACH
  2) Determination of RA-RNTI of PDCCH for scheduling RAR
    A. Option A: (When Option 1 is applied) the UE/BS determines an RA-RNTI based on the last (or first) RO index (in terms of time) belonging to the RO group. That is, the RA-RNTI is determined based on the last (or first) RO in the RO group (refer to Equation 1)
      i. Note: For a single RO group, the UE performs RAR detection only on a single RA-RNTI.
    B. Option B: (When Option 2 is applied) the UE/BS determines an RA-RNTI based on an RO index of each of a plurality of ROs belonging to the RO group. That is, the RA-RNTI is determined based on each RO in the RO group (refer to Equation 1)
      ii. Note: For a single RO group, the UE performs RAR detection on a plurality of RA-RNTIs.

Option A may be understood as an example in which one (common) RA-RNTI is associated with ROs belonging to the same RO group. Option B may be understood as an example in which different RA-RNTIs are associated with each RO in the same RO group.

Then, in the case of RO beam comb-B, at least one or Option 1/2 or a combination thereof may be applied/configured for an RAR reception operation corresponding to transmission of an RO group and determination of the RA-RNTI of a PDCCH for scheduling an RAR.

In addition, in the case of RO beam comb-B, the UE may select/configure a final (best) TX beam thereof using the following method according to Option 1/2.
  1) When Option 1 is applied
    A. Information on a specific RO belonging to an RO group (e.g., index) may be indicated to the UE through the RAR (or PDCCH scheduling the same) corresponding to the corresponding RO group. The UE may operate to apply the TX beam used for transmission of a received/indicated specific RO (index) to subsequent UL channel/signal transmission (e.g., Msg3 PUSCH). For example, the BS may receive the corresponding UL channel/signal (e.g., the UE uses the corresponding Rx beam assuming that a UL channel/signal is transmitted based on information on the corresponding RO) based on information on the RO indicated through an RAR or a PDCCH for scheduling the same.
      i. Note: For example, a specific RO (index) indicated through an RAR (or PDCCH) may be an RO (index) having the most excellent reception quality in terms of a BS.
  2) When Option 2 is applied
    A. The UE may operate to apply a TX beam used for transmission of an RO (index) corresponding to a received RAR (an RA-RNTI of a PDCCH for scheduling the same) to subsequent UL channel/signal transmission (e.g., Msg3 PUSCH).
      i. Option X: The UE may operate to monitor an RAR (a PDCCH for scheduling the same) corresponding to each of a plurality of ROs belonging to an RO group and to perform corresponding Msg3 transmission only on a first received RAR (in terms of time) (by applying the TX beam determination method).

ii. Option Y: The UE may operate to perform corresponding Msg3 transmission only on one specific RAR among RAR(s) received in response to a plurality of ROs belonging to a RO group (by applying the TX beam determination method). That is, when one UE receives a plurality of RARs, the UE may perform Msg3 only on any one RAR (i.e., specific RAR). The specific RAR may include an RAR corresponding to earliest/last RO in time, an RAR determined based on a Transport Block Size (TB S) of scheduled Msg3, and/or a last received RAR in time.

In the case of RO beam comb-C, since SSBs (indexes) associated with ROs belonging to the RO group are different from each other, Option 2/Option B may be applied/configured to an RAR reception operation and RA-RNTI determination. In this case, the following issues may be additionally considered in relation to the RAR/Msg3/Msg4 transmission/reception operation.

1) Issue 1: RAR reception and Msg3 transmission
   A. Option X: The UE may operate to monitor an RAR (PDCCH for scheduling the same) corresponding to each of a plurality of ROs belonging to an RO group and to perform a subsequent RACH procedure (including corresponding Msg3 transmission) only on a first received RAR (in terms of time).
   B. Option Y: The UE may operate to perform a subsequent RACH procedure (including Msg3 transmission) only on one specific RAR among a plurality of RARs received in response to a plurality of ROs belonging to an RO group. For example, the specific RAR may include an RAR corresponding to an RO associated with an SSB having the most excellent reception quality (e.g., RSRP), an RAR corresponding to an RO associated with the lowest/highest SSB index, an RAR corresponding to the earliest/late RO in time, an RAR determined based on a Transport Block Size (TB S) of scheduled Msg3, and/or an RAR that is last received in time.
   C. Option Z: The UE may operate to perform a subsequent RACH procedure (including Msg3 transmission) on each of a plurality of RARs received in response to a plurality of ROs belonging to an RO group.

2) Issue 2: Msg3 retransmission and Msg4 reception
   A. When Option Z is applied, the UE may operate to transmit each of Msg3 (corresponding to different RARs) based on a plurality of temporary C-RNTIs (TC-RNTIs) indicated through a plurality of RARs.
   B. Then, for retransmission scheduling DCI reception or Msg4 transmission for the plurality of Msg3 or scheduling related DCI reception for Msg4 transmission, the UE may operate to perform PDCCH monitoring on the plurality of TC-RNTIs.

3) Issue 3: RA-RNTI PDCCH monitoring configuration (e.g., the UE may perform blind detection on PDCCH candidates (e.g., candidates on a search space) in which a CRC of a PDCCH is scrambled (or masked) with an RA-RNTI based on at least one of the following RA-RNTI, PDCCH search space configuration information, an SSB, and/or an RO, and configuration and signaling of the UE/BS are proposed)
   A. Method 1: Through SIB or RRC signaling, for each of a plurality of different SSB indexes (associated with a plurality of RO (indexes) belonging to an RO group), a PDCCH search space for corresponding RA-RNTI-based PDCCH monitoring (for scheduling an RAR) (e.g., information of a PDCCH monitoring period and monitoring start offset) may be configured for each SSB index (sub-group) (i.e., an RO associated with each SSB index (sub-group)).
      i. Note: The UE may operate to perform PDCCH monitoring (using an RX beam corresponding to each of the corresponding SSB indexes) on PDCCH search spaces configured for SSB indexes associated with an RO group (ROs belonging thereto) transmitted by the UE.
   B. Method 2: One or more PDCCH search spaces for RA-RNTI-based PDCCH monitoring (for scheduling an RAR) may be configured (for each RO group or for each SSB index set associated with ROs belonging to each RO group). In this state, through SIB or RRC signaling, a PDCCH monitoring time point corresponding to each of a plurality of different SSB indexes (associated with a plurality of RO (indexes) belonging to an RO group) (or sub-groups of corresponding SSB indexes) on a corresponding PDCCH search space may be configured for each SSB index (sub-group) (i.e., RO associated with each SSB index (sub-group)).
      i. Note: The UE may operate to perform PDCCH monitoring (using an RX beam corresponding to each of corresponding SSB indexes) for monitoring time points configured for SSB indexes associated with an RO group (ROs belonging thereto) transmitted by the UE.
   C. Method 3: One or more PDCCH search spaces for RA-RNTI-based PDCCH monitoring (for scheduling an RAR) may be configured (for each RO group or for each SSB index set associated with ROs belonging to each RO group). In this state, based on a specific rule, a PDCCH monitoring time point (occasion) corresponding to each of a plurality of different SSB indexes (associated with a plurality of RO (indexes) belonging to an RO group) (or sub-groups of corresponding SSB indexes) on a PDCCH search space may be configured for each SSB index (sub-group) (i.e., RO associated with each SSB index (sub-group)).
      i. Note: As an example of the specific rule, within an entire monitoring occasion (MO) set on a PDCCH search space, for a $k^{th}$ SSB index (an RO associated therewith), the UE may operate to monitor $\{n*K+k\}^{th}$ MO (n=0, 1, . . . ). Here, K refers to the number of SSB indexes associated with an RO group (ROs belonging thereto) or the number of all SSB indexes. k may refer to a $k^{th}$ SSB index among SSB indexes associated with an RO group or a $k^{th}$ SSB index among all SSB indexes.

4) Issue 4: TC-RNTI PDCCH monitoring configuration (e.g., the UE may perform blind detection on PDCCH candidates (e.g., candidates on a corresponding search space) in which a CRC of a PDCCH is scrambled (or masked) with a TC-RNTI based on at least one of the following TC-RNTI, PDCCH search space configuration information, an SSB, and/or an RO, and configuration and signaling of the UE/BS are proposed)
   A. Method 1: Through SIB or RRC signaling, for each of a plurality of different SSB indexes (associated with a plurality of RO (indexes) belonging to an RO group), a PDCCH search space for a TC-RNTI-based PDCCH monitoring (for scheduling Msg3 retransmission or Msg4 transmission) for scheduled Msg3 transmission from a corresponding RAR (e.g., information of a PDCCH monitoring period and monitoring start offset)

may be configured for each SSB index (sub-group) (i.e., an RO associated with each SSB index (sub-group)).
  i. Note: The UE may operate to perform PDCCH monitoring (using an RX beam corresponding to each of the corresponding SSB indexes) on PDCCH search spaces configured for SSB indexes associated with an RO group (ROs belonging thereto) transmitted by the UE.
B. Method 2: One or more PDCCH search spaces for TC-RNTI-based PDCCH monitoring (for scheduling Msg3 retransmission or Msg4 transmission for Msg3 scheduled to an RAR) may be configured (for each RO group or for each SSB index set associated with ROs belonging to each RO group). In this state, through SIB or RRC signaling, a PDCCH monitoring time point corresponding to each of a plurality of different SSB indexes (associated with a plurality of RO (indexes) belonging to an RO group) (or sub-groups of corresponding SSB indexes) on a corresponding PDCCH search space may be configured for each SSB index (sub-group) (i.e., RO associated with each SSB index (sub-group)).
  i. Note: The UE may operate to perform PDCCH monitoring (using an RX beam corresponding to each of corresponding SSB indexes) for monitoring time points configured for SSB indexes associated with an RO group (ROs belonging thereto) transmitted by the UE.
C. Method 3: One or more PDCCH search spaces for TC-RNTI-based PDCCH monitoring (for scheduling Msg3 retransmission or Msg4 transmission for Msg3 scheduled with an RAR) may be configured (for each RO group or for each SSB index set associated with ROs belonging to each RO group). In this state, based on a specific rule, a PDCCH monitoring time point (occasion) corresponding to each of a plurality of different SSB indexes (associated with a plurality of RO (indexes) belonging to an RO group) (or sub-groups of corresponding SSB indexes) on a PDCCH search space may be configured for each SSB index (sub-group) (i.e., RO associated with each SSB index (sub-group)).
  i. Note: As an example of the specific rule, within an entire monitoring occasion (MO) set on a PDCCH search space, for a $k^{th}$ SSB index (an RO associated therewith), the UE may operate to monitor $\{n*K+k\}^{th}$ MO (n=0, 1, ...). Here, K refers to the number of SSB indexes associated with an RO group (ROs belonging thereto) or the number of all SSB indexes. k may refer to a $k^{th}$ SSB index among SSB indexes associated with an RO group or a $k^{th}$ SSB index among all SSB indexes.
5) Issue 5: Collision between PDCCH monitoring time points
A. PDCCH monitoring time points (based on an RA-RNTI for scheduling an RAR) corresponding to different RO (indexes) (associated with different SSB indexes) belonging to the same RO group may overlap. In this case, (i.e., when monitoring time points between a plurality of PDCCHs with different reception beam directions overlap), the UE may perform PDCCH (RA-RNTI) monitoring only on one specific RO (SSB). For example, the specific RO may include an RO associated with an SSB having the most excellent reception quality (e.g., RSRP), an RO associated with the highest/lowest SSB index, or the earliest/late RO in time.
B. PDCCH monitoring time points (based on an TC-RNTI for scheduling Msg3 retransmission or Msg4 transmission) for a plurality of Msg3 transmission corresponding to different RO (indexes) (associated with different SSB indexes) belonging to the same RO group may overlap. In this case, (that is, when monitoring time points between a plurality of PDCCHs with different reception beam directions overlap), the UE may perform PDCCH (TC-RNTI) monitoring only on one specific Msg3 (SSB). For example, the specific Msg3 may include Msg3 corresponding to an RO associated with an SSB having the most excellent reception quality (e.g., RSRP), Msg3 corresponding to an RO associated with the lowest/highest SSB index, or Msg3 corresponding to the earliest/late RO in time.

PRACH Power Ramping

Power ramping for PRACH transmission may be performed using the following method according to an RO group type.
  1) In the case of RO group type-1
    A. After failing to receive an RAR corresponding to transmission of an RO group associated with a single specific SSB (index), when the UE selects RO groups associated with the same SSB (index) for PRACH retransmission, the UE may operate to comprehensively increase PRACH transmission power (compared with previous power) in a plurality of ROs belonging to the corresponding RO group.
      i. Note: All power offset values added to all ROs belonging to an RO group may be the same, and final PRACH power to which the corresponding offset is added may be configured equally among all ROs belonging to the RO group.
  2) In the case of RO group type-2
    A. After failing to receive an RAR corresponding to transmission of an RO group associated with a plurality of specific SSB (indexes), when the UE selects RO groups associated with the same SSB (index) for PRACH retransmission, the UE may operate to comprehensively increase PRACH transmission power (compared with previous power) in a plurality of ROs belonging to the corresponding RO group.
      i. Note: All power offset values added to a plurality of ROs belonging to an RO group may be the same, but final PRACH power to which the corresponding offset is added may be configured separately/independently for each RO. Thus, the final PRACH power may be configured to be different (or the same) between a plurality of ROs in the RO group. For example, the final PRACH power of each RO may be configured separately/independently based on a difference in an RSRP (path-loss based thereon) between SSB (indexes) associated with the corresponding RO.

Figure 13:
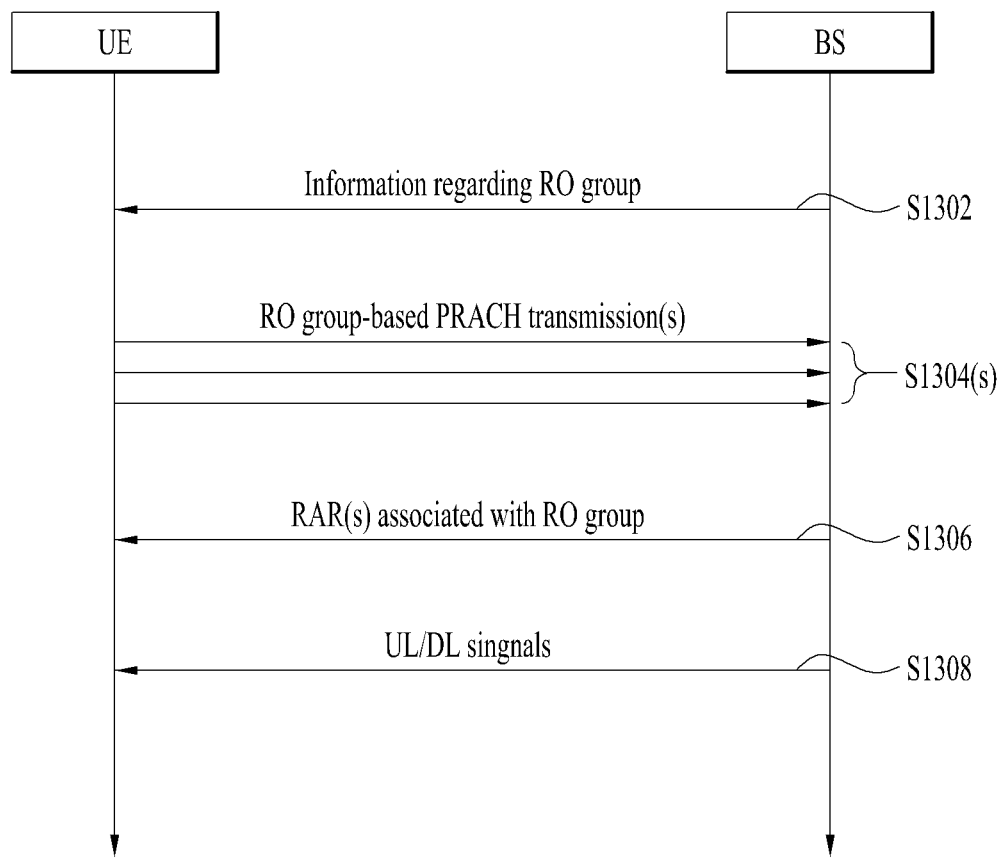
FIG. 13 illustrates RACH processes according to the present disclosure.

FIG. 13 illustrates an RO group-based RACH process. The present disclosure is not limited to FIG. 13, and repetition with the above description may be omitted.

Referring to FIG. 13, a UE may receive information on an RO group from a BS (S1302). The information on the RO group may be received through system information or may be configured/reconfigured through RRC signaling (in an RRC-connected state). The information on the RO group may include Alt 1) and/or Alt 2) and is not limited thereto. The information on the RO group may be assumed to relate to a corresponding BS, but for handover or dual-connectivity, the information on the RO group for a neighboring BS may be provided. The UE may identify or configure an RO group based on the information on the RO group. The RO grouping method may be various methods described above.

Then, the UE may transmit a PRACH through at least one RO among RO groups (S1304(s)). The PRACH may be transmitted through, for example, Msg 1 or MsgA. The PRACH may be transmitted through each RO in the RO group. The UE may configure a PRACH transmission method based on an RO group type. For example, a PRACH may be transmitted based on RO beam comb-A/B/C according to an RO group type.

After transmitting a PRACH through an RO group, the UE may receive a BS response (i.e., RAR) for an RO group (i.e., PRACH) from the BS (S1306). The RAR may be received through, for example, Msg 2 or MsgB. The UE may receive an RAR based on at least one of Option 1/2/A/B. The BS may generate and transmit an RAR based on at least one of Option 1/2/A/B. In more detail, the UE/BS may transmit and receive an Msg2 signal based on at least some of Issue 1, Issue 3, and/or Issue 5 (or a combination thereof).

Then, the UE/BS may transmit and receive a DL/UL signal (S1308). The DL/UL signal may include Msg 3/4. The DL/UL signal may include a UL/DL signal exchanged after an RACH procedure ends. In detail, the UE/BS may transmit and receive Msg3/4 signals based on at least some of Issue 1, Issue 2, Issue 4, and/or Issue 5 (a combination thereof).

In the present disclosure, the "beam" may be expressed/replaced using a (beamformed) signal/channel/resource transmitted through a corresponding beam. For example, a beam index may be expressed/replaced with an index of a signal/channel/resource corresponding to the corresponding beam. In addition, the "beam" may be expressed/replaced using a signal/channel/resource associated with a corresponding beam to identify the corresponding beam. For example, when different terminal Tx beams are configured according to ROs within an RO group, a BS may determine a TX beam used by a UE through the RO index or the SSB index associated with the RO.

FIG. 14 illustrates a communication system 1 applied to the present disclosure.

Referring to FIG. 14, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a B S/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 15:
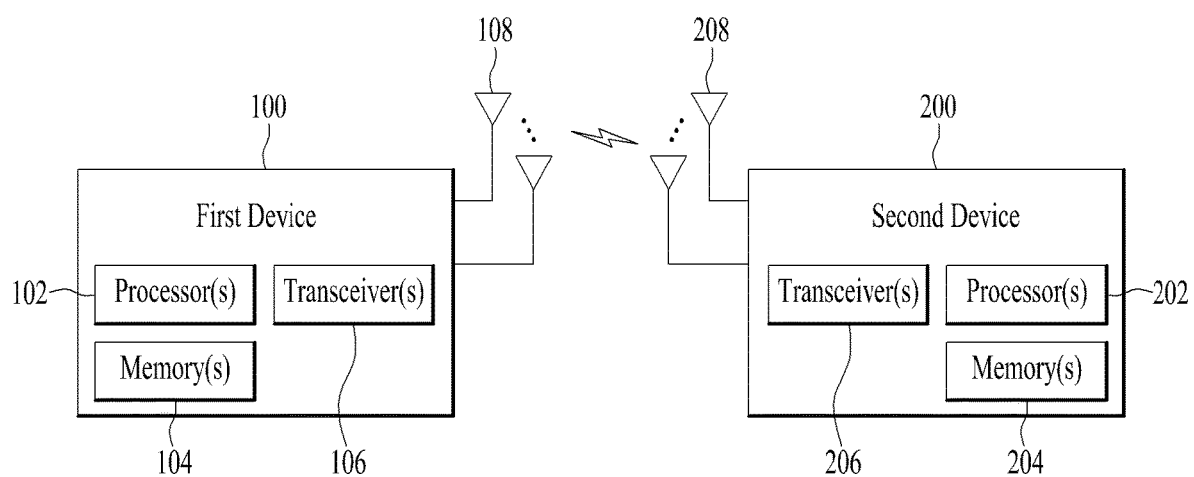

FIG. 15 illustrates wireless devices applicable to the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 16:
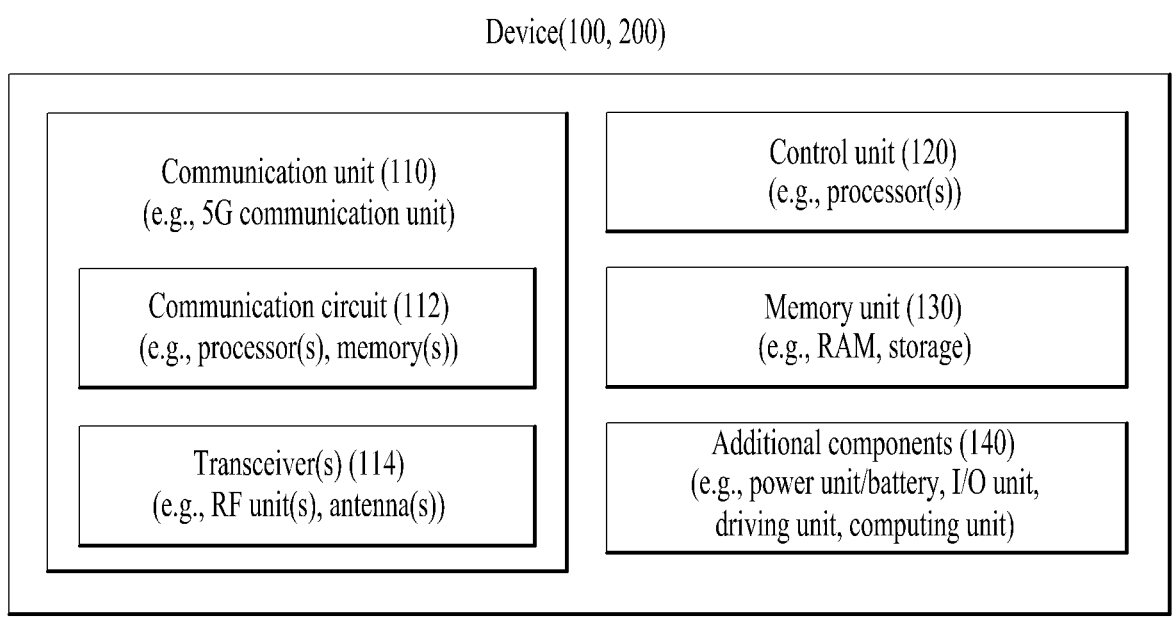

FIG. 16 illustrates another example of a wireless device applied to the present disclosure. The wireless device may be implemented in various forms according to a use-case/service (refer to FIG. 14).

Referring to FIG. 16, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 17:
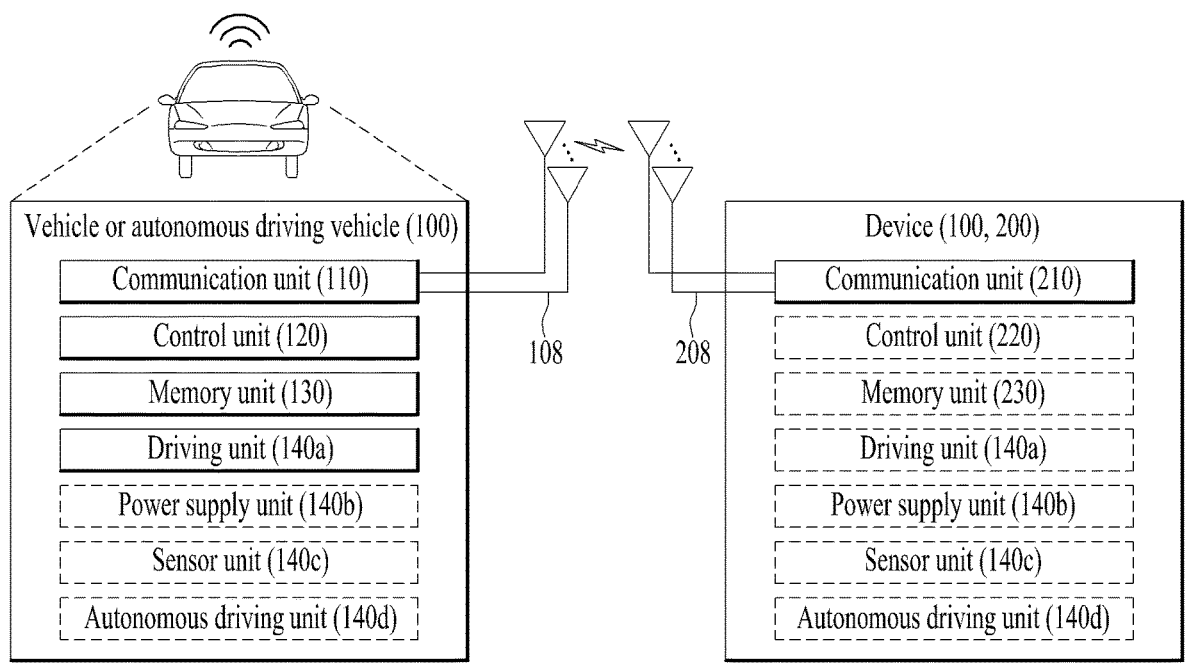

FIG. 17 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 17, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure is applicable to UEs, eNBs or other apparatuses of a wireless mobile communication system.

What is claimed is:

1. A method comprising:
   transmitting a random access preamble with repetitions, wherein the random access preamble is transmitted on physical random access channel occasions (ROs) in a set, and the ROs in the set are associated with a same preamble index,
   after the random access preamble being transmitted with the repetitions, monitoring a physical downlink control channel (PDCCH) for a random access response (RAR) identified by a random access-radio network temporary identifier (RA-RNTI) while a RAR window is running;
   receiving the PDCCH including downlink assignment;
   receiving the RAR based on the PDCCH; and
   transmitting a physical uplink shared channel (PUSCH) based on the RAR,
   wherein the RAR window is started based on an end of all repetitions of transmission of the random access preamble, and
   wherein the RA-RNTI is computed based on a last RO in the set.

2. The method of claim 1, wherein, based on RARs being received after the repetitions, the PUSCH is transmitted only for one RAR corresponding to an RO associated with a Synchronization Signal Block (SSB) having most excellent reception quality among the RARs.

3. The method of claim 1, wherein one RO group includes M ROs that are associated with M SSB indexes and Time Division Multiplexed (TDMed) with each other.

4. The method of claim 1, wherein
   each RO belonging to the set of ROs corresponds to each reception beam of the BS.

5. A user equipment (UE) comprising:
   at least one radio frequency (RF) unit; and
   at least one processor; and
   at least one computer memory operatively connected to the at least one processor and configured to cause the at least one processor to perform an operation when executed:
   wherein the operation comprising:
   transmitting a random access preamble with repetitions, wherein the random access preamble is transmitted on physical random access channel occasions (ROs) in a set, and the ROs in the set are associated with a same preamble index;
   after the random access preamble being transmitted with the repetitions, monitoring a physical downlink control channel (PDCCH) for a random access response (RAR) identified by a random access-radio network temporary identifier (RA-RNTI) while a RAR window is running;
   receiving the PDCCH including downlink assignment;
   receiving the RAR based on the PDCCH; and
   transmitting a physical uplink shared channel (PUSCH) based on the RAR,
   wherein the RAR window is started based on an end of all repetitions of transmission of the random access preamble, and
   wherein the RA-RNTI is computed based on a last RO in the set.

6. The UE of claim 5, wherein, based on RARs being received after the repetitions, the PUSCH signal is transmitted only for one RAR corresponding to an RO associated with a Synchronization Signal Block (SSB) having most excellent reception quality among the RARs.

7. The UE of claim 5, wherein one RO group includes M ROs that are associated with M SSB indexes and Time Division Multiplexed (TDMed) with each other.

8. The UE of claim 5, wherein:
   each RO belonging to the set of ROs corresponds to each reception beam of the BS.

9. A base station (BS) comprising:
   at least one radio frequency (RF) unit;
   at least one processor; and
   at least one computer memory operatively connected to the at least one processor and configured to cause the at least one processor to perform an operation when executed:

wherein the operation comprising:

receiving a random access preamble with repetitions, wherein the random access preamble is received on physical random access channel occasions (ROs) in a set, and the ROs in the set are associated with a same preamble index;

after the random access preamble being received with the repetitions, transmitting a physical downlink control channel (PDCCH) search spaces for a random access response (RAR) identified by a random access-radio network temporary identifier (RA-RNTI) while a RAR window is running, wherein the PDCCH includes downlink assignment;

transmitting the RAR based on the PDCCH; and receiving a physical uplink shared channel (PUSCH) based on the RAR, wherein the RAR window is started based on an end of all repetitions of transmission of the random access preamble, and wherein the RA-RNTI is computed based on a last RO in the set.

* * * * *